(12) United States Patent
Chase et al.

(10) Patent No.: US 8,041,814 B2
(45) Date of Patent: Oct. 18, 2011

(54) METHOD, SYSTEM AND COMPUTER PROGRAM PRODUCT FOR HIERARCHICAL LOAD BALANCING

(75) Inventors: Jeffrey Scott Chase, Durham, NC (US); Ronald P. Doyle, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2672 days.

(21) Appl. No.: 09/894,016

(22) Filed: Jun. 28, 2001

(65) Prior Publication Data

US 2003/0005116 A1    Jan. 2, 2003

(51) Int. Cl.
*G06F 15/173* (2006.01)
(52) U.S. Cl. .................................. 709/225; 709/226
(58) Field of Classification Search .................. 709/225, 709/226
See application file for complete search history.

(56) References Cited

U.S. PATENT DOCUMENTS

| | | | |
|---|---|---|---|
| 5,787,470 A * | 7/1998 | DeSimone et al. | 711/124 |
| 5,944,780 A * | 8/1999 | Chase et al. | 709/201 |
| 5,949,786 A * | 9/1999 | Bellenger | 370/401 |
| 5,991,306 A * | 11/1999 | Burns et al. | 370/429 |
| 6,006,259 A | 12/1999 | Adelman et al. | 709/223 |
| 6,006,264 A * | 12/1999 | Colby et al. | 709/226 |
| 6,049,528 A * | 4/2000 | Hendel et al. | 370/235 |
| 6,078,960 A | 6/2000 | Ballard | 709/229 |
| 6,098,093 A * | 8/2000 | Bayeh et al. | 709/203 |
| 6,119,143 A | 9/2000 | Bias et al. | 709/201 |
| 6,240,461 B1 * | 5/2001 | Cieslak et al. | 709/235 |
| 6,507,854 B1 * | 1/2003 | Dunsmoir et al. | 715/501.1 |
| 6,674,769 B1 * | 1/2004 | Viswanath | 370/469 |
| 6,704,786 B1 * | 3/2004 | Gupta et al. | 709/228 |
| 6,745,243 B2 * | 6/2004 | Squire et al. | 709/227 |
| 6,862,606 B1 * | 3/2005 | Major et al. | 709/203 |
| 2001/0034792 A1 * | 10/2001 | Swildens | 709/238 |
| 2002/0007415 A1 * | 1/2002 | Douglis et al. | 709/230 |
| 2002/0048269 A1 * | 4/2002 | Hong et al. | 370/389 |
| 2002/0069241 A1 * | 6/2002 | Narlikar et al. | 709/203 |
| 2002/0184327 A1 * | 12/2002 | Major et al. | 709/213 |
| 2003/0236745 A1 * | 12/2003 | Hartsell et al. | 705/40 |

OTHER PUBLICATIONS

"Application Note URL Switching with Serveriron," *Foundry Networks*, pp. 1-5.
"Open System Interconnection (OSI) Protocols," *Internetworking Technology Overview*, Chapter 32, pp. 32-1 to 32-8, (Jun. 1999).

* cited by examiner

*Primary Examiner* — Alina N. Boutah
(74) *Attorney, Agent, or Firm* — Cuenot, Forsythe & Kim, LLC

(57) ABSTRACT

An improved load balancing method, system, and computer program product handles popular object requests using a front-end cache, and hashing is applied only to the requests in the stream that were not handled by the front-end cache. A cache (e.g., a web proxy cache) is placed in front of a Level 7 switch, such that the cache services the popular requests from the cache based on the content of the request (e.g., based on the portion of an HTTP request following the domain name). The remaining requests are hashed and then routed to the back-end server. This allows the requests that make it past the cache to still be routed to the back-end server and take advantage of the efficiencies provided therefrom.

10 Claims, 5 Drawing Sheets

METHOD, SYSTEM AND COMPUTER PROGRAM PRODUCT FOR HIERARCHICAL LOAD BALANCING

BACKGROUND OF THE INVENTION

1. Field of the Invention

The present invention relates generally to an improved system, method, and computer program product for providing load balancing. A more particular aspect is related to a system, method, and computer program product for hierarchical load balancing, wherein frequently requested objects (e.g., web objects) are handled by a front end cache and objects not in the cache are routed to back-end servers. The popular requests are serviced directly from the cache and the remaining requests are "URL hashed" to determine the destination server in a known manner.

2. Background of the Invention

The traffic on the World Wide Web ("The Web") is increasing exponentially. The Web is used for a multitude of tasks, including information gathering, electronic commerce, communication, and news dissemination. As a result of this high traffic volume, systems have been developed to distribute Web traffic to minimize waiting time for users.

Many of today's web sites are hosted on server farms, where a number of servers are grouped together to serve web requests as they arrive. To avoid overloading individual servers within the farm, load balancing techniques balance the load across servers so that the best total throughput of the farm and smallest response delay for the user is achieved. Typically, a "server switch" performs request distribution for the server farms, utilizing various techniques for determining the destination server to handle the request. One such technique, called Server Load Balancing (SLB), monitors at short, periodic intervals the load of the servers in the farm and distributes incoming requests to the least loaded server.

Content Based Routing (CBR) takes advantage of information in the request to assist in the server selection. The term "hashing" is used throughout the present application generally to CBR and specifically to any form of routing which examines part or all of the content of a request and then routes the request based on the content. "URL hashing" is one form of hashing which exploits the "locality" of the request stream by examining the request information and sending requests to a server that has previously served this request. While this may result in sending the request to a server that is not the least-loaded server, it may require less overall work for the entire server farm.

The term "URL" stands for "Universal Resource Locator" and is a method for naming web objects in the Internet. Using a URL, a user of the Internet can connect to a file on any computer connected to the Internet anywhere in the world. A typical URL is a string expression conforming to the following convention: protocol://host name/folder or directory on host/name of file or document. For example, the URL "http://www.ibm.com/products" is parsed as follows. The "http" stands for the "HyperText Transport Protocol". This directs the browser (e.g., Internet Explorer or Netscape) to use the http protocol when accessing the document. The "www.ibm.com" is the host name for the IBM main website. As is well-known, each host name is associated with an IP address via the Domain Name System (DNS), which returns an address corresponding to the host name. For example, an IP address associated with www.ibm.com is "0.1.0.7".

The "/products/" means that there is a folder or subdirectory on the IBM website called "Products". Although not shown, within that folder there may be multiple file names, and by adding one of these file names to the URL the computer inputting the URL will be directed to that file.

When using URL hashing, the URL is hashed to give it a unique numerical value, which values are assigned to the URL and stored in a table. Each incoming URL is hashed and sent to a particular server and the identification of that server is stored in the table with the hash value; when the hashed value of an incoming URL matches that of a stored hash value in the table, the request is sent to the same server that it was previously sent to.

FIG. 1 illustrates a load balancing system 100 in accordance with the prior art. A network 105 of computer work stations 110*a*, 110*b*, 110*c*, and 110*d* are connected to a network connection 112 (e.g., the Internet) in a known manner. It is understood that although a network 105 of four computer work stations 110*a*-110*d* are shown in FIG. 1, a single computer work station connected to the Internet or many more computer work stations than the four shown in FIG. 1 may be utilized to equal effect.

A URL hashing switch 114 (e.g., a hashing switch from the "ServerIron" family of switches manufactured by Foundry Networks) is coupled between the network connection 112 and a server farm 116. In the example shown in FIG. 1, the server farm 116 comprises plural servers 118*a*, 118*b*, 118*c*, and 118*d*. In accordance with this prior art system, when a user of the computer network 105 inputs a URL into a web browser executing on, for example, work station 110*a*, the URL is transmitted over the Internet in a known manner and is received by URL hashing switch 114. In accordance with this prior art technique, URL hashing switch 114 hashes the URL and stores the URL in a table. Using the system of FIG. 1, the URL hashing switch 114 "decides" which server in server farm 116 will handle each incoming URL, based on its hash value. The URL hashing switch 114 may be pre-configured to direct certain hash values to certain servers, or the hash values can be assigned to servers as the requests arrive based on standard SLB techniques.

Some known load balancing methods involve placing a front-end processor before the server farm to distribute the load among the back-end servers by keeping track of the load of the back end servers and routing requests to the least-loaded server, while also exploiting the locality of the request stream by routing repeat requests to the same server. Locality-Aware Request Distribution (LARD) is one such system. Other methods have focused on front-end processors that perform level 4 switching (TCP level switching) to balance the load at back-end servers using a round robin technique. These systems may also store load information about the back-end servers and use this load information to improve upon the round robin scheduling (which would otherwise not consider the load of the servers). The IBM Network Dispatche™ is one such system implemented in software. Other vendors implement these types of systems in switches. Level 4 switching techniques do not attempt to take advantage of the locality of the request stream, meaning that requests that may already have been processed by one server for a client may be sent to a different server for a different client.

While each of the above methods operate reasonably well, each method involves sending the request through a routing switch for determining to which server to send the request.

SUMMARY OF THE INVENTION

The present invention provides an improved load balancing method, system, and computer program product in which popular requests are handled by a front-end cache, and hashing is applied only to the requests in the stream that were not handled by the front-end cache.

In a preferred embodiment, a web proxy cache is placed in front of a Level 7 switch, such that the web proxy cache services the popular requests from the cache based on the URL, i.e., based on the portion of the HTTP request following the domain name. The remaining requests are URL-hashed and then routed to the backend server. This allows the requests that make it past the web proxy cache to still be routed to the back-end server cache and take advantage of the efficiencies provided therefrom. Preferably the web proxy cache and the Level 7 hashing switch are combined as a single functional element, either in hardware or software.

In a more preferred embodiment, a Level 4 switch is placed in front of a plurality of web proxy caches, each of which are in turn placed in front of (or combined with) a respective Level 7 switch, each of which are connected to a respective server farm, so that incoming web requests are handled on a round robin basis before being sent to the web proxy cache, thus improving the throughput from the server farms to the requesting clients.

DETAILED DESCRIPTION OF THE PREFERRED EMBODIMENTS

Figure 1:
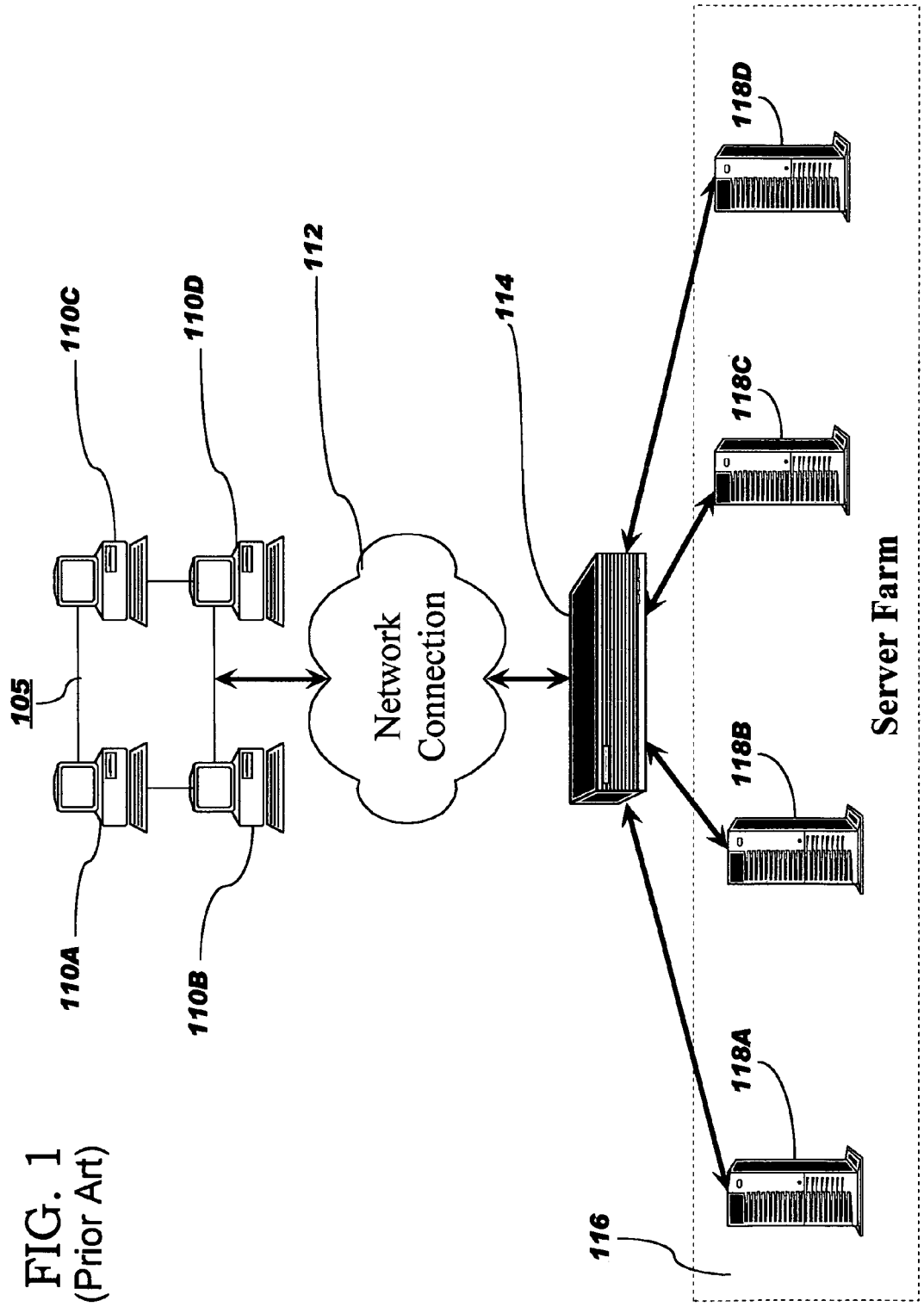
FIG. 1 is a block diagram of a load balancing system in accordance with the prior art.
Figure 2:
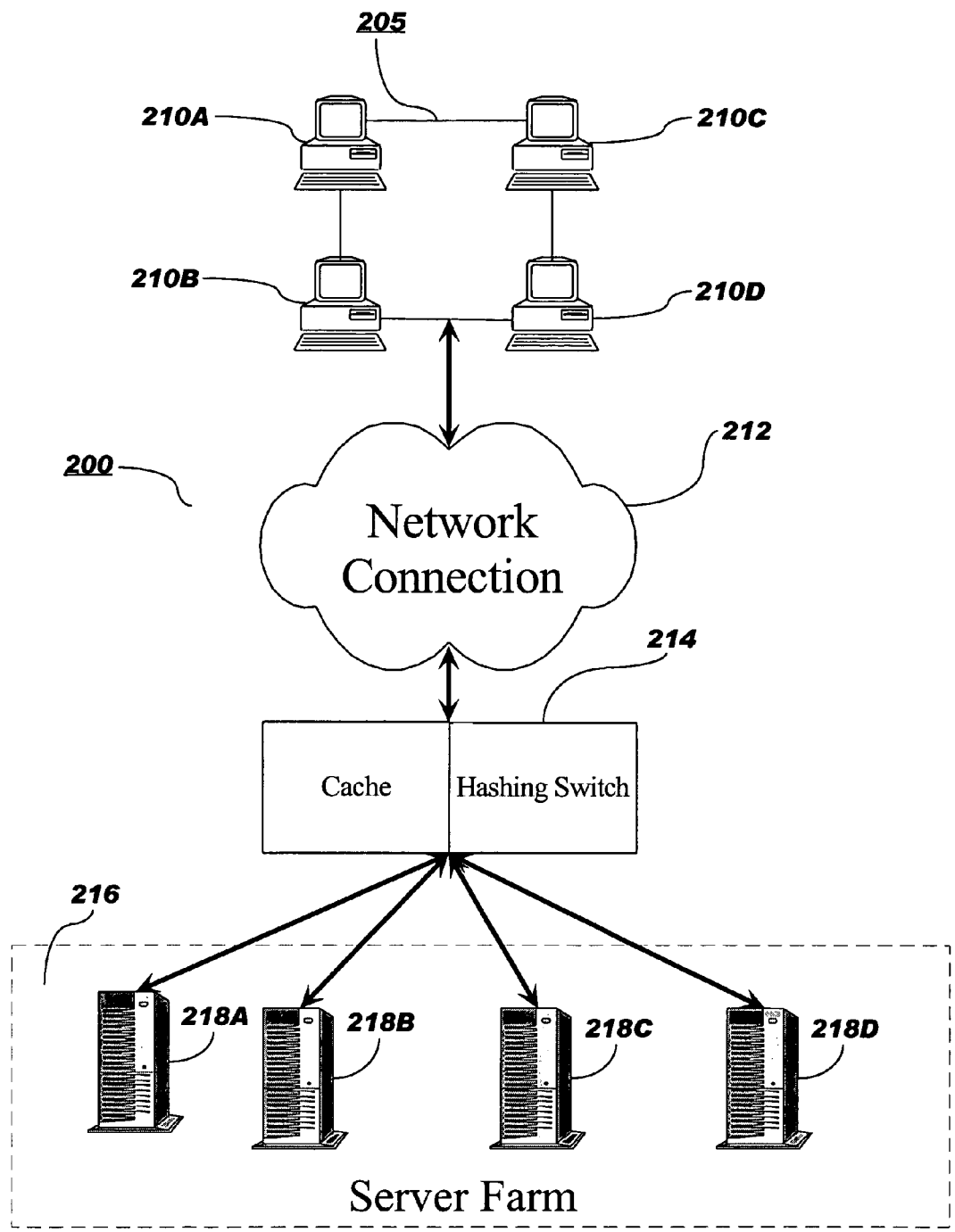
FIG. 2 is a block diagram of an improved load balancing system in accordance with the present invention.

FIG. 2 is a block diagram of an improved load balancing system in accordance with the present invention. Referring to FIG. 2, a group of clients 205, comprising for example, plural workstations 210a, 210b, 210c, and 210d is connected via network connection 212 (e.g., the Internet), to a "Caching/Hashing Switch" (CHS) 214, which is in turn connected to a server farm 216 comprising, for example, plural web servers 218a, 218b, 218c, and 218d.

In accordance with the present invention, CHS 214 performs both a caching and switching function. It is understood, however, that the same novel functionality can be accomplished using a cache situated in front of a separate hashing switch. When a request is received for the first time by CHS 214, the requested object will not be found in the cache. The term "object" as used herein refers generally to files, HTML responses, or any other content that a client might request from a server. The request is then hashed using known hashing techniques and sent to the destination server. The requested object is delivered to the CHS 214 where it is stored, and a copy of the requested object is sent on to the requesting client.

For subsequent requests for objects that have previously been requested, they will be either served directly from the cache if they are still present (e.g., if the storage period for the cache, relative to the request, has not expired) or they are hashed again and sent to the same server that served them the first time.

Figure 3:
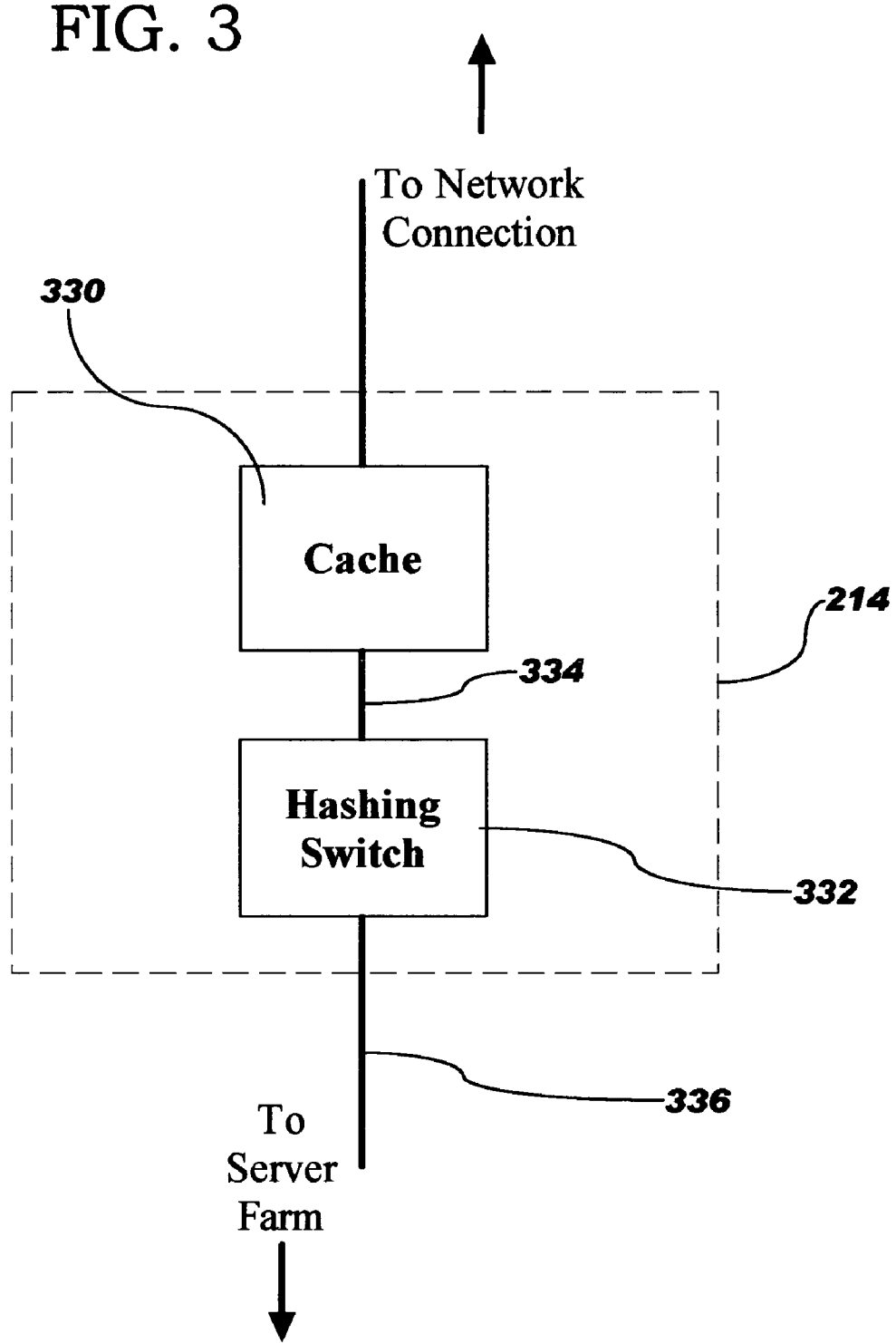
FIG. 3 is a block diagram of an example of a Caching/Hashing Switch 214 in accordance with the present invention.

FIG. 3 is a block diagram of an example of a combined CHS 214 in accordance with the present invention. Referring now to FIG. 3, CHS 214 comprises a single caching/hashing element, i.e., it is a single functional element having a built-in web caching and URL hashing function. How to build these combined functions into a single functional element will be apparent to those skilled in the art.

CHS 214 includes a web proxy cache 330 and a URL-hashing switch 332. The web proxy cache 330 is coupled to the client side via the network connection and is also coupled to the URL-hashing switch 332. URL-hashing switch 332 is in turn connected to the server farm via connection 336. By configuring the CHS 214 to first satisfy any web requests from the web proxy cache 320 (by looking for the requested object in the cache) and, if a "cache-miss" occurs, only then sending the request on to the URL-hashing switch 332 via connection 334, previously requested popular web requests are satisfied without having to burden the server farm, thereby increasing the efficiency of the overall operation of the system. Configuration of these functions can be accomplished by any known methodology; for example, it is well within the ordinary skill of a programmer to be able to write software code to control the CHS 214 so that stored objects for which requests are received are satisfied by return of the cached object, and to hash the request and forward it to the server farm to be satisfied only if the requested object is not found in the cache.

Figure 4:
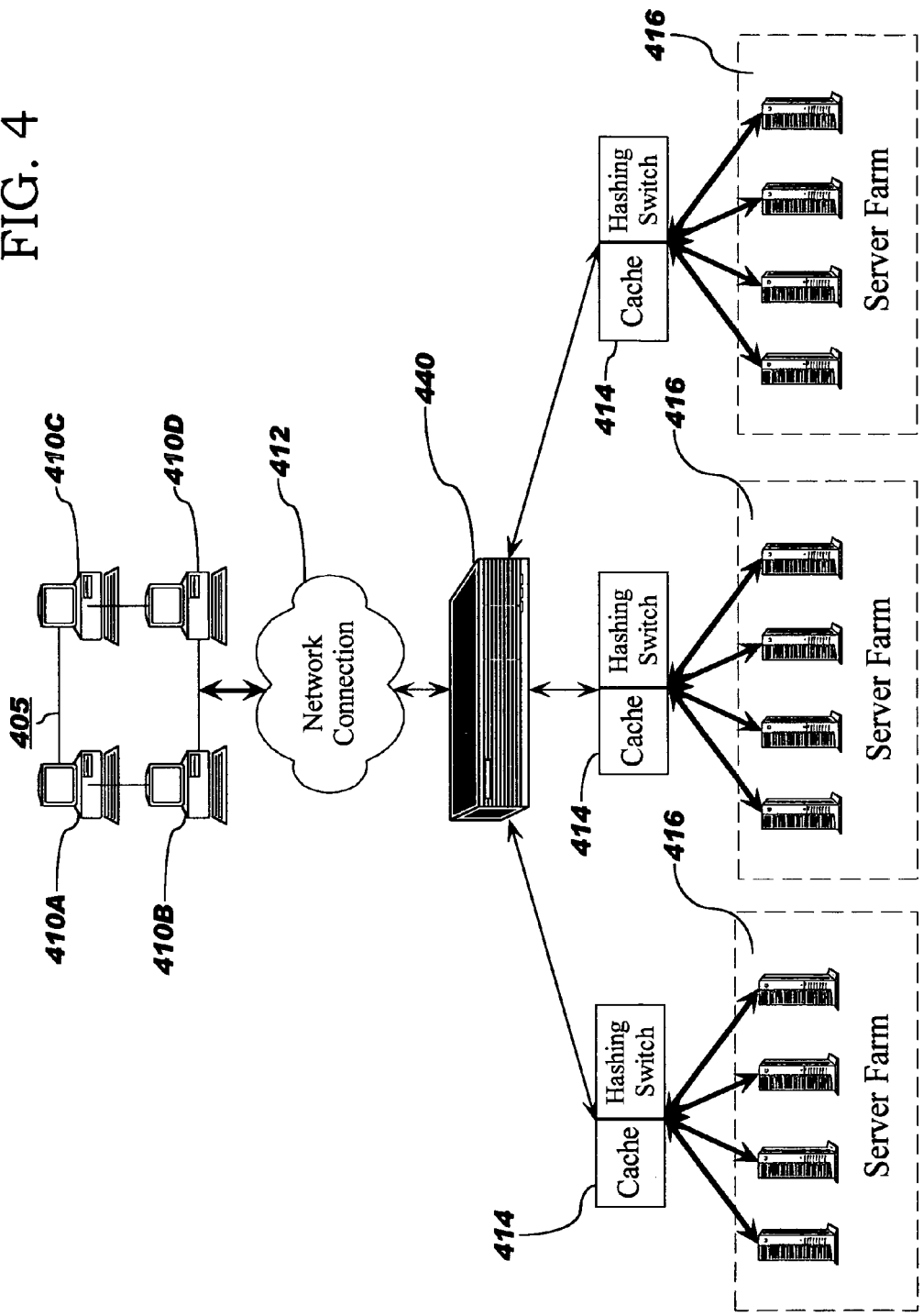
FIG. 4 is a block diagram of a hierarchical load balancing system in accordance with the present invention.

In a preferred embodiment, a hierarchical system is employed as shown in FIG. 4. The system illustrated in FIG. 4 will help minimize server farm throughput "bottlenecks" that may occur due to having a proxy cache at the front end of the system. As shown in FIG. 4, a Level 4 switch 440 is employed between the client devices 405/Network Connection 412 and multiple CHS's 414 and server farms 416 as shown. Level 4 switch 440 performs round robin routing (or any other SLB technique) to the CHS's 414. A benefit of this approach is that the Level 4 switches can be bought "off the shelf" and combined with the CHS of the present invention (or a functional equivalent thereof) to provide greater scalability. The system illustrated in FIG. 4 is arbitrarily scalable because more CHS elements may be added between the Level 4 switch and the server farms (and thus additional server farms may also be added).

Figure 5:
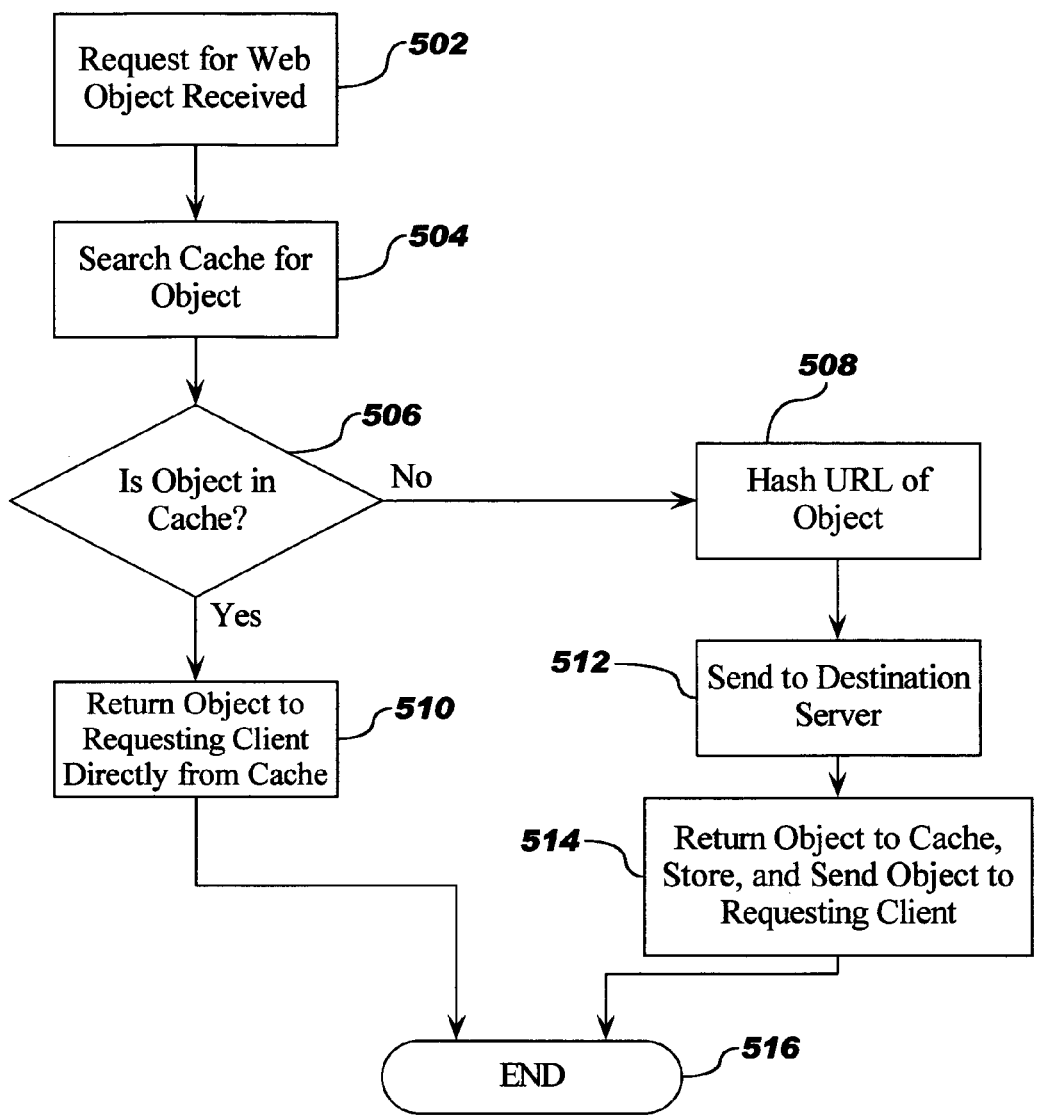
FIG. 5 is a flow chart illustrating the basic steps carried out in accordance with the present invention.

FIG. 5 is a flowchart illustrating the basic steps of operation of the present invention. At step 502, a request for a web object is received by the CHS (214 in FIG. 2) and at step 504, the web proxy cache of the CHS is searched to determine if the requested object is stored therein (step 506). If the object is already stored in the web proxy cache, at step 510 the object is immediately returned to the client directly from the web proxy cache, with no need to burden the server with fulfilling the request, and the process ends at step 516.

On the other hand, if, at step 506 it is determined that the object is not in the web proxy cache, at step 508 the URL of the object is hashed in a known manner and, at step 512, the hash value is sent to the destination server. At step 514, upon receipt of the object request, in the form of the hash value, the server returns the object to the web proxy cache, stores the object in the web proxy cache for future reference, and then sends the requested object to the requesting client. Finally, at step 516 the process ends.

The process utilized by the hierarchical system illustrated in FIG. 4 is essentially identical, except that, prior to delivery of the web object request from the client, the requests pass through Level 4 switch 440 which performs conventional round robin routing to the individual cache/switches 414.

Using the approach of the present invention, client connections are always terminated in the web proxy cache and the URL hashing may be performed on each HTTP request not found in the web proxy cache for determining which back end server to route the request to. This means that even with HTTP 1.1, it is possible to balance the load at the http request level and to take advantage of the locality of each request. HTTP 1.1 added extensions to the HTTP protocol, one of which allowed multiple requests to flow over a single connection from client to web (or web proxy) server. This invention allows requests within the single connection to be routed independently.

By handling "popular" web requests using a front-end cache and then utilizing hashing techniques for the un-cached requests, the load-balancing for the remaining requests can be maximized, and the system overall is arbitrarily scalable since, as described above, more CHS's may be added behind the Level 4 switch and more back-end servers may be added behind the additional CHS's.

Although the present invention has been described with respect to a specific preferred embodiment thereof, various changes and modifications may be suggested to one skilled in the art and it is intended that the present invention encompass such changes and modifications as fall within the scope of the appended claims.

The invention claimed is:

1. A system for improved load balancing in a client/server environment, comprising:
    at least one caching/hashing switch (CHS) coupled between clients and servers in said client/server environment, said CHS storing previously-requested objects, said CHS comprising:
        a hashing switch coupled to said servers; and
        a front end cache coupled between said clients and said hashing switch;
    wherein object requests for objects stored in said CHS are satisfied immediately from said CHS.

2. The systems of claim 1, wherein said CHS also hashes object requests, and wherein:
    object requests which are not stored in said CHS are hashed;
    each of said hashed object requests are forwarded to a respective server on which each requested object is stored;
    each of said requested objects is forwarded to said CHS and stored thereon; and
    a copy of each of said requested objects is returned to a respective client requesting said object.

3. The system of claim 2, wherein said objects are web objects and wherein said CHS comprises:
    a web proxy cache; and
    a URL-hashing switch coupled to said web proxy cache.

4. The system of claim 2, wherein said objects are web objects and wherein said CHS comprises:
    computer usable code configured to operate as a web proxy cache for storing retrieved web objects; and
    computer usable code configured to operate as a URL-hashing switch, for hashing said web object requests and forwarding said hashed web object requests to said respective servers.

5. The system of claim 4, wherein said client/server environment comprises a plurality of clients coupled to at least one server farm via a network connection.

6. The system of claim 4, wherein said client server environment comprises a plurality of clients coupled to a plurality of server farms via a network connection, and wherein each of said server farms has a CHS associated therewith, and wherein said system further comprises:
    a Level 4 switch coupled between said network connection and said CHS's.

7. A method of improved load balancing in a client/server environment, comprising:
    receiving an object request from a client;
    determining if the object requested by said object request is stored in a cache coupled between said client and a hashing switch coupled to a server farm;
    if said object is stored in said cache, immediately returning a copy of said object to said client; and
    if said object is not stored in said cache, then:
        hashing said object request using said hashing switch;
        forwarding said hashed object request to said server farm;
        forwarding said requested object from said server farm to said cache for storage; and
        returning a copy of said requested object to said client.

8. A computer program product for providing improved load balancing in a client/server environment, the computer program product comprising a computer usable memory having computer usable program code embodied therein, the computer usable program code comprising:
    computer usable program code configured to receive an object request from a client;
    computer usable program code configured to determine if the object requested by said object request is stored in a cache coupled between said client and a server farm;
    computer usable program code configured to immediately return a copy of said object to said client if said object is stored in said cache;
    computer usable program code configured to hash said object request;
    computer usable program code configured to forward said hashed object request to said server farm;
    computer usable program code configured to forward said requested object from said server farm to said cache for storage; and
    computer usable program code configured to return a copy of said requested object to said client.

9. An improvement to a load balancing system in a client/server environment having at least one client coupled, via a network connection, to a plurality of servers, and a hashing switch coupled between said network connection and said plurality of servers, said improvement comprising:
    a cache coupled between said network connection and said hashing switch, said cache storing previously requested objects and configured to satisfy requests for said previously requested objects without passing said requests to said hashing switch.

10. A computer hardware device for improved load balancing in a client/server environment, comprising:
    means for receiving an object request from a client;
    means for determining if the object requested by said object request is stored in a cache coupled between said client and a hashing switch coupled to a server farm;
    means for, if said object is stored in said cache, immediately returning a copy of said object to said client; and
    means for, if said object is not stored in said cache:
        hashing said object request using said hashing switch;
        forwarding said hashed object request to said server farm;
        forwarding said requested object from said server farm to said cache for storage; and
        returning a copy of said requested object to said client.

* * * * *